Fig. 3
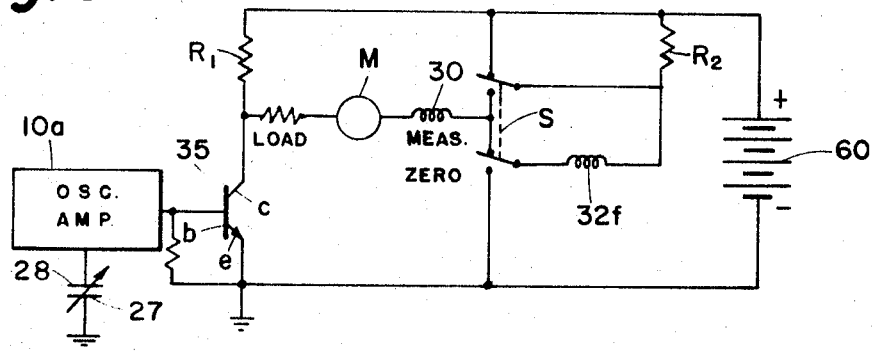
Fig. 4
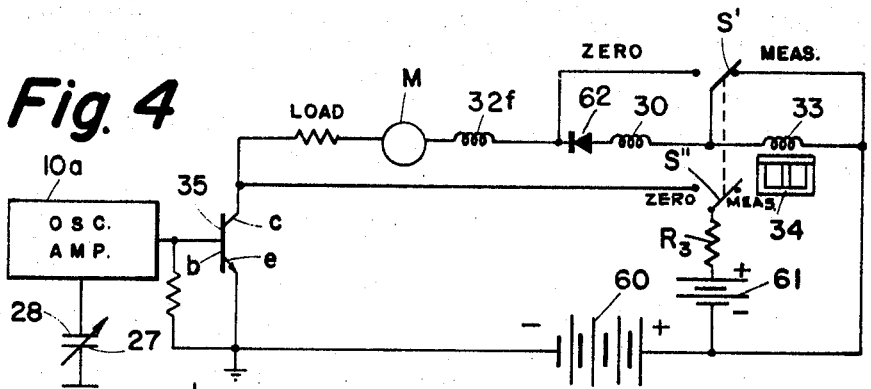
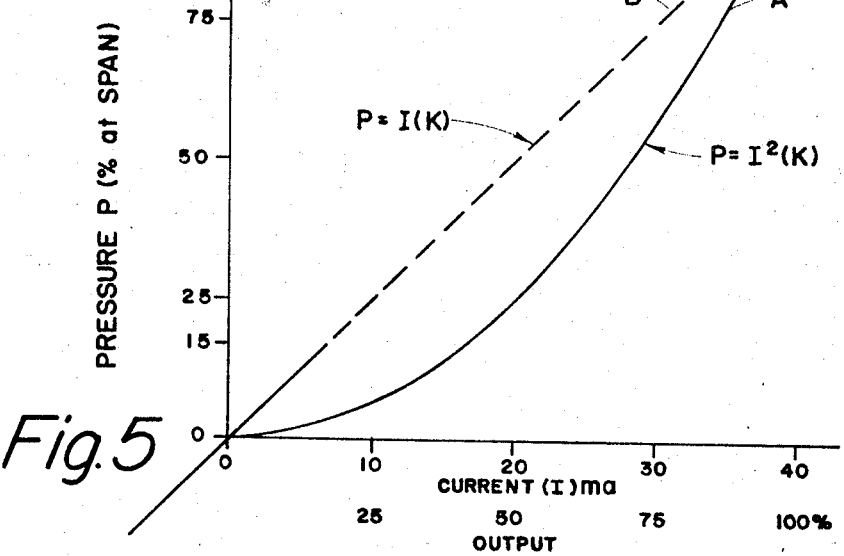
Fig. 5

United States Patent Office 3,449,651
Patented June 10, 1969

3,449,651
INDEPENDENT ZERO AND RANGE ADJUSTMENTS FOR NONLINEAR OUTPUT DIFFERENTIAL PRESSURE TRANSMITTER FORCE BALANCE SYSTEM
Edward J. Cranch, Bryn Athyn, and Robert H. Stanwood, Gwynedd, Pa., assignors to Leeds & Northrup Company, Philadelphia, Pa., a corporation of Pennsylvania
Filed Feb. 23, 1965, Ser. No. 434,457
Int. Cl. G05b *11/01;* G01l *9/14, 27/00*
U.S. Cl. 318—22   13 Claims

ABSTRACT OF THE DISCLOSURE

A nonlinear force balance transmitter for measuring parameters such as liquid flow is provided with a circuit which allows momentary conversion to a linear force balance transmitter for precise zero adjustment. Load current normally driven through moveable and fixed coils with interaction magnetic fields to produce the desired nonlinear force on the moveable coil as a function of this current is momentarily removed from the fixed coil during zero adjustment and the moveable coil is caused to operate in a constant magnetic field which results in the force on the moving coil being linearly related to the current therethrough.

---

This invention relates to a low pressure differential pressure transmitter of the force balance type and has for an object a nonlinear output transmitter including means for independent zero and range adjustments.

In a force balance differential pressure transmitter, in which the feedback force is obtained from a current-conducting coil in a permanent magnet field, the feedback force is a linear function of current, with constant slope through zero. The zero adjustment can accurately give zero output current for zero pressure differential, and the span adjustment will not affect this zero adjustment.

In a typical nonlinear force balance transmitter a current output signal is desired which represents rate of flow through an orifice, primarily for metering or controlling purposes. Since the differential pressure applied to the detecting diaphragm varies as the square of the flow rate, a square root extracting transducer is required as part of the transmitter to provide a nonlinear output signal. This is accomplished by causing the output load to be in series with both the feedback coil and the field coil to provide the electromagnetic force balance means. Therefore, the balancing force can be represented by the formula for a parabolic curve $I^2=P$. Near the zero value of the variable quantity P, the curve is asymptotic to the coordinate current. In this region minute changes of pressure produce relatively major changes of current. Consequently, it is extremely difficult to set the current to zero at zero flow. In order to overcome this difficulty in the past, it was the practice to set zero current with the output 10–20 percent "upscale." Because the zero reading is then affected by the span setting, calibration of the transmitter required several alternate settings of zero and span.

In order to overcome the uncertainty and lack of stability and improve the accuracy of such a nonlinear transmitter in the zero flow region, it has heretofore been proposed to provide continuous solutions to the zero area stability problem which introduced a force which distorted the true output current of the transmitter while in operation. The present invention permits the use of an undistorted current output signal while metering and yet provides for accurate zero setting when calibrating. The present invention provides a means of momentarily converting a nonlinear transmitter circuit to one which measures differential pressure linearly while the zero is being set at zero flow. The span adjustment can then be made without affecting the zero adjustment.

In accordance with the present invention, there is provided a nonlinear transmitter such as a square root extracting flow transmitter of the force balance type. Such transmitter includes a stationary electromagnet having a field coil for producing a magnetic field. It also includes a balance beam having a feedback coil at one end thereof suspended in the magnetic field of the field coil. A damping coil is supported by the balance beam in the field of a permanent magnet. A load is connected in series with the field coil and the feedback coil during measurement. A variable impedance such as a variable resistance means, the value of which is controlled by the output of a differential pressure sensing oscillator-amplifier means, is connected in the circuit with the load and the feedback and field coils. Provision is made for connecting a power supply in the circuit for the oscillator-amplifier means and to provide the output current for the circuit. Switching means is connected between two of the coils and to one side of the power supply. The switching means is operable from a measuring position to a zero adjusting position to remove one of the coils from the series circuit during zero adjustment and to produce a resulting force on the balance beam which varies linearly as the mechanical zero adjustment is being made thereby permitting the transmitter to be calibrated for a precise zero current output with zero flow input.

In accordance with one aspect of the invention, the transmitter output circuit is momentarily converted to a circuit to measure differential pressure linearly while the zero is being set at zero flow by connecting the switching means between the feedback coil and the damping coil so that the damping coil may be connected in series with the field coil and the load during zero adjustment, thus, temporarily acting as the feedback coil while the feedback coil itself is shorted out of the circuit; and during measurement the feedback coil is returned to the series circuit with the field coil and load while the damping coil is shorted out of the circuit and resumes its normal damping function.

In accordance with a further aspect of the invention, the damping coil is not used for zero adjustment. Instead, the field coil is switched from the output current circuit to the power supply so that the field coil then carries a fixed current and, thus, produces a fixed magnetic field in the air gap of the electromagnet during zero adjustment. In accordance with this aspect of the invention, the output circuit becomes a bridge circuit during zero adjustment so the load current can go negative and the zero output current can be approached from either side of zero while operating the zero adjustment.

For further objects and advantages of the invention and for a more detailed description thereof, reference is to be had to the following specification taken in conjunction with the accompanying drawings in which:

FIG. 1a is a perspective view of the arrangement for transmitting torque through a pressure seal on an externally supported shaft as utilized in FIG. 1;

FIG. 3 is a schematic diagram of the electrical circuit of the transmitter shown in FIGS. 1 and 2;

FIG. 4 is a schematic diagram of a modification of the electrical circuit for the transmitter shown in FIGS. 1 and 2; and FIG. 5 is a plot of pressure or force versus output current and useful in explaining the principle of operation of the present invention.

Figure 1:
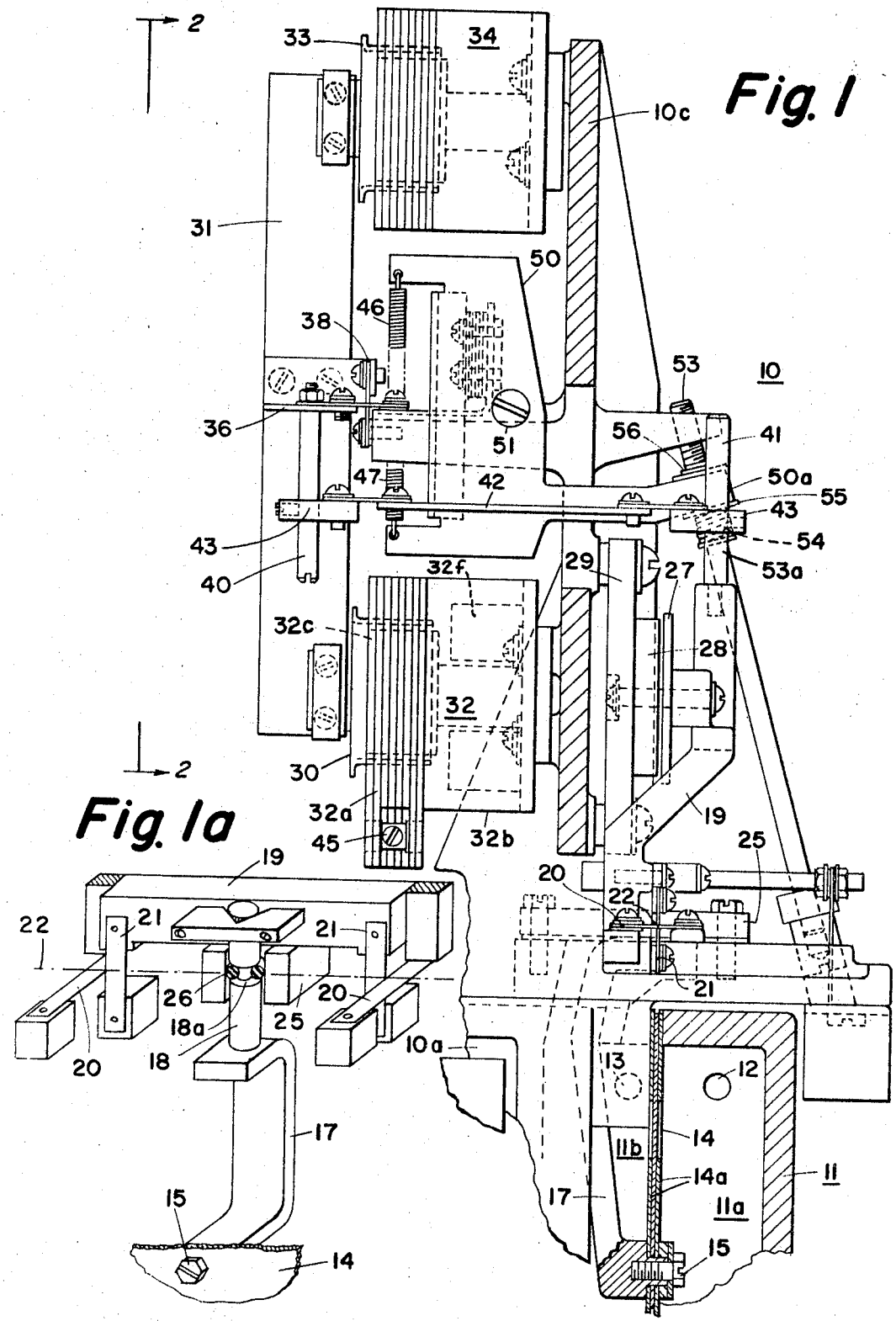
FIG. 1 is a schematic view partly in section of a nonlinear differential pressure transmitter of the force balance type embodying the present invention.

Referring to FIG. 1, the invention has been illustrated in connection with one type of nonlinear differential pressure transmitter of the force balance type; namely, a square root extracting or flow transmitter which is adapted to convert a differential pressure to an electric current. The force balance transmitter 10 includes a differential pressure cell or housing 11 which has a pair of inlet ports 12 and 13 to which high and low pressure connections are made. The inlet ports 13 and 12 are supplied with pressure from the low pressure and high pressure sides, for example, of an orifice plate in a flow line. It will be noted that the inlet ports 12 and 13 are disposed on opposite sides of a flexible diaphragm 14, the edges of which are clamped between mating parts of the housing 11. The center portion of the flexible diaphragm 14 is provided, on both of its surfaces, with rigid plate members 14a through which extend a clamp screw 15. The flexible diaphragm 14 divides the housing 11 into two separate chambers 11a and 11b with the flexible diaphragm 14 providing a common wall between the two chambers 11a and 11b.

The diaphragm 14 is connected, by clamp screw 15, to one end of an arm 17 and the other end of arm 17 is secured to one end of a shaft 18, FIG. 1a. The shaft 18 extends out of the interior of housing 11 and has its opposite end secured to a beam member 19. As may be seen in FIGS. 1 and 1a, the beam member 19 is connected to a pair of horizontal flat pivot spring members 20 disposed on opposite sides of the shaft 18 and a pair of vertical flat pivot spring members 21, also disposed on opposite sides of the shaft 18. The cooperating pairs of flat pivot springs 20 and 21 cross each other at right angles thereto and their center lines, through their points of intersection, lie on a common center line which defines a common pivotal axis 22. The opposite ends of the flat pivot springs 20 and 21 are secured to stationary parts of the frame for the transmitter 10. Thus, it will be seen that the beam member 19 and the arm 17 are rigidly secured to each other by means of the intermediate shaft 18 and all three members 17–19 constitute a lever which is adapted to pivot about the pivotal axis 22.

As previously mentioned, the shaft 18 extends out of the housing 11. In order to maintain the pressure within the diaphragm chamber 11b, a sealing block or plate 25 is secured to the housing 11 and over the opening therein through which the shaft 18 extends. The shaft 18 extends through an opening in the sealing plate 25. The shaft 18 is provided with an annular sealing ring 26 of the O-ring type, or equivalent, which may be made of an elastomer material including rubber or other suitable equivalent plastic material such as nylon, fluorocarbon resin and the like. The O-ring 26 forms a seal on its inner circumference with the shaft 18 and on its outer circumference with the opening through the sealing plate 25. As may be seen in FIG. 1a, the shaft 18 is provided with an annular groove 18a which receives the annular sealing O-ring 26. The groove 18a is so positioned as to maintain the center of O-ring 26 on the common center line or axis 22 of the pivots 20 and 21. Since the beam 19 of the force balance transmitter moves through very small angles, in the order of about ten minutes of an angle maximum, and since the O-ring 26 is at the center of rotation, the O-ring 26 does not slip and contribute a friction error and the amount of strain of the ring is so small that the hysteresis is negligible.

The torque transmission with improved shaft seal, as described above, is claimed in copending application Ser. No. 434,566, filed concurrently herewith by Hickox, now Patent 3,315,528.

The beam 19 is provided with a movable capacitor plate 27 which is adapted to cooperate with a stationary capacitor plate 28 supported from one side of insulator member 29. The capacitor plate 27 is moved relative to the stationary capacitor plate 28 in response to changes in the differential pressure applied to the opposite sides of the diaphragm 14. The change in the spacing between the capacitor plates 27 and 28 produces a change in capacitance in an oscillator circuit, the oscillator-amplifier of which is located within the housing portion 10a, FIG. 1. The specific details of the oscillator-amplifier do not form part of the present invention and, thus, are disclosed by block diagram in FIGS. 3 and 4. However, the oscillator-amplifier may be similar to the oscillator-amplifier disclosed in United States Patent 2,957,115, Clark et al. The present measuring circuit incorporates a variable capacitor comprising plates 27 and 28, rather than a variable inductor, and other features as described hereinafter in connection with FIGS. 3 and 4.

As may be seen in FIGS. 3 and 4, the electrical circuit of the transmitter is provided with a suitable D.C. power supply schematically illustrated as a battery. The D.C. output from the oscillator-amplifier and output transistor 35 contained in the housing portion 10a is fed by way of electrical conductors to a feedback coil 30 which is suspended at one end of a pivoted beam 31, FIGS. 1 and 2, in the magnetic field in the air gap of a stationary electromagnet 32 including a field coil 32f supported on frame member 10c.

In the low pressure flow force balance differential pressure transmitter 10, a nonlinear current output signal is desired for representing a rate of flow through an orifice for metering or control. Since the differential pressure applied to the detecting diaphragm 14 varies as the square of the flow rate, a square root extracting transducer is included in the transmitter to provide a nonlinear output signal. This is accomplished by having the output current in series with both the feedback coil 30 and the field coil 32f to provide the electromagnetic force balancing means. Since the output current I, flowing in coil 30, is flowing in the field of magnet 32 provided by the current in field coil 32f, it is acted upon by a motor force which is a parabolic function of current with zero slope (or gain) through zero and which tends to force the coil 30 out of the gap of electromagnet 32. Therefore, the balancing force P can be represented by the formula for a parabolic curve A, FIG. 5, where $I^2 = P$.

Figure 2:
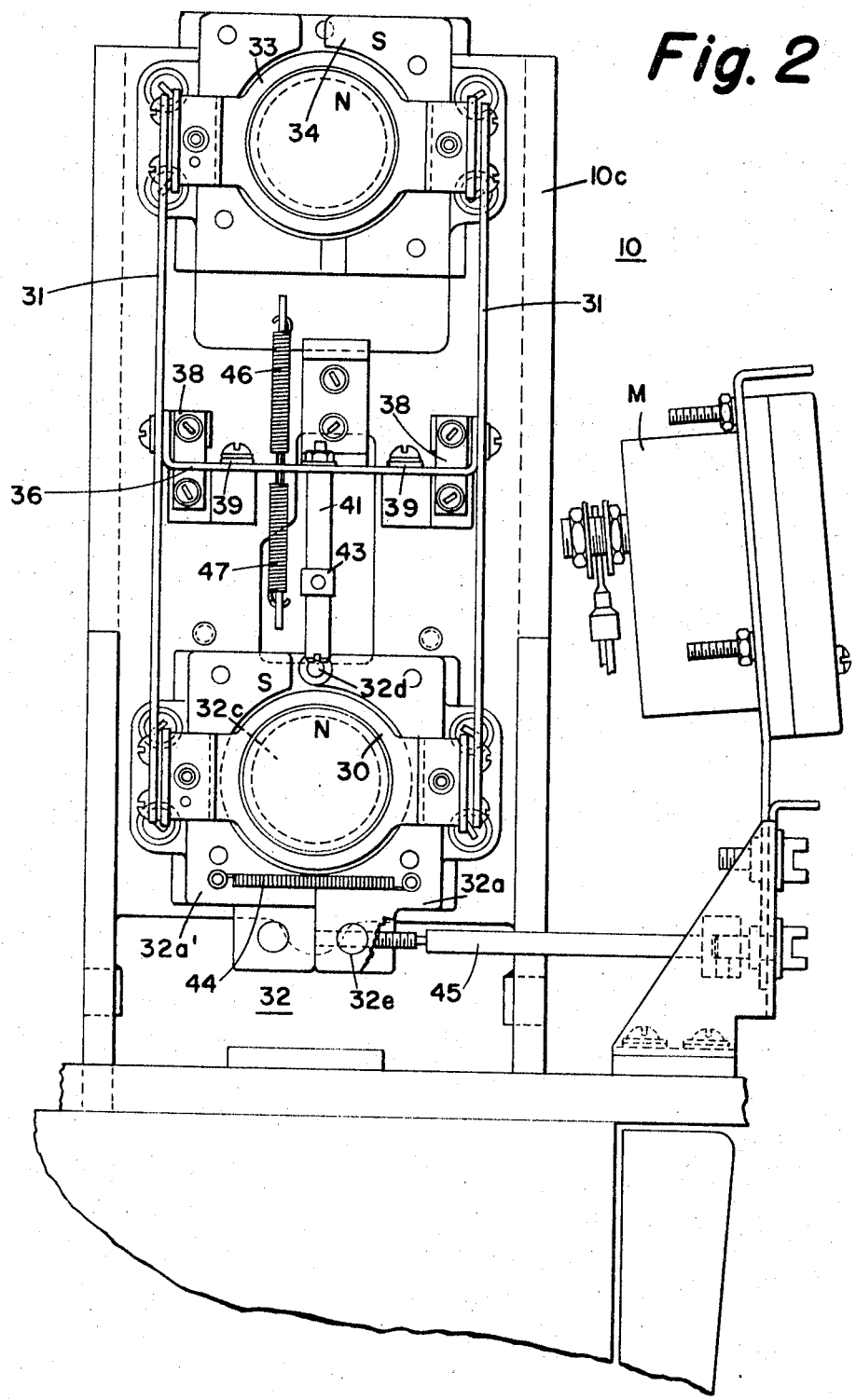
FIG. 2 is a side elevational view looking in the direction of arrows 2—2 in FIG. 1.

As may be seen in FIG. 1, the electromagnet 32 comprises a magnet frame 32b which supports a pole piece 32c including the field coil 32f. The magnet frame 32b also supports magnetic structure 32a and 32a' in spaced relation with the pole piece 32c forming a magnetic air gap into which the feedback coil 30 extends. The magnetic structure 32a', FIG. 2, is fixed to the magnet frame 32b while the magnetic structure 32a is connected to the magnet frame 32b by means of a pivot 32d. Thus, it will be seen that the magnetic structure comprises a pair of sections 32a and 32a', one of which is adjustable relative to the other. The sections 32a and 32a' of the magnetic structure are each made up of a plurality of layers of iron plates having semicircular surfaces on the inner edges thereof which are adapted to be spaced from the circumference of the pole 32c and cooperate therewith to produce a circular magnetic air gap. As may be seen in FIG. 2, the section 32a is provided with an extension which is adapted to support a threaded female insert 32e which, in turn, is adapted to receive the threaded end of a threaded rod or screw member 45. The outer end of the screw member 45 is adapted to be accessible from the exterior of the housing or casing for the transmitter 10 for manual adjustment. The purpose of this adjustment will hereinafter be described.

The opposite end of the beam 31 is provided with a damping coil 33 which is suspended in the field of a permanent magnet 34, also supported by the frame member 10c. The beam 31 comprises a pair of spaced members which are connected, intermediate their ends, by means of a U-shaped bracket 36. The bracket 36 is supported from the frame 10c by two pairs of spaced crossed flat pivot springs 38 and 39 which are similar to the pivot springs 20 and 21 previously described. Thus, the crossed pivot springs 38 and 39 provide a flexible pivot bearing for the beam 31. Depending from the midportion of the U-shaped member 36 is a stud 40 which is similar to the stud 41 extending from the end of the beam 19. The studs 40 and 41 are connected, by means of a flexible link 42 which transmits the torque produced by the motor force on coil 30 from beam 31 to beam 19 and restores the movable capacitor plate 27 on beam 19 substantially to its original positon. The link 42 is provided, at its opposite ends, with connectors 43, respectively adjustable along the studs 40 and 41 to provide a rough or coarse range or span adjustment by varying the ratio of the lever arms on the two beams 19 and 31.

The fine range or span adjustment is accomplished by adjusting the magnetic air gap relative to the feedback coil 30 by means of the screw member 45 associated with the magnetic structure section 32a as shown in FIGS. 1 and 2. Lengthening the air gap weakens the field and requires the transmitter to send more output current through the feedback coil 30 in order to balance the force on the diaphragm. By hinging the magnetic structure section 32a on pivot 32d, so that it can be rotated away from the other section 32a', this enables a rather large portion of the complete circuit magnetic air gap to be lengthened. The threaded rod 45, with one end pushing on the fixed half of 32a' of the magnetic structure, forces the hinged half 32a away as the rod is rotated using a screw driver slot at the opposite end of the rod. As pointed out above, to provide a span trimming adjustment which can be changed without disturbing the beam system, the force on the feedback coil 30 at a full output, for example, about 40 milliamperes, should be adjustable by about five percent. In the arrangement illustrated in FIGS. 1 and 2, about one quarter inch motion of the insert 32e changes the air gap sufficiently to produce the required five percent change in output current. A tension spring 44, having its opposite ends secured to the respective sections 32a and 32a', is effective to close the air gap again as the threaded rod 45 is rotated in the closing direction. The span trimming adjustment described above is claimed in copending application Ser. No. 434,567, filed concurrently herewith by Cranch and Hickox, issued June 25, 1968, as U.S. Patent No. 3,390,386.

The beam 31 is urged to a zero position by means of a pair of coil springs 46 and 47 which are connected, at one end, to a member extending from the bracket 36 carried by the beam 31 and, at their opposite ends, to a bracket 50 carried by a pivot 51 extending into the frame 10c. The bracket 50 is provided with an arm 50a which is adapted to be connected to an adjustable shaft 53, the lower end of which is accessible from the exterior of the housing for the transmitter 10. The shaft 53 extends through the arm 50a and a compression spring 54, held between a fixed shoulder 53a and a washer 55 on shaft 53, places a biasing force on the arm 50a holding the latter against a fixed stop member 56, also carried by shaft 53. By rotating the shaft 53, which is threaded about its axis, the bracket 50 may be rotated about its pivot 51 causing the springs 46 and 47, which are connected to one side of the pivotal axis of beam 31, to vary the force applied to the connection to the beam 31 thereby adjusting the zero position of the capacitor plate 27 by moving beam 19 by means of link 42. The plate 27 is in the zero position when the output current is zero.

As may be seen in FIG. 5, near the zero value of the variable quantity P, the curve A is asymptotic to the co-ordinate current I. In this region, minute changes of pressure produce relatively major changes of current. Consequently, it is extremely difficult to set the current to zero at zero flow. In a force balance differential pressure transmitter, in which the feedback force is obtained from a current-conducting coil in a permanent magnet field, the force is a linear function of current, with constant slope through zero. This is illustrated by the straight line curve B in FIG. 5. For a differential pressure transmitter the zero adjustments can accurately give zero output current for zero pressure differential, and the span adjustment will not affect this zero adjustment.

The present invention provides a method and means for momentarily converting the nonlinear output circuit of the flow transmitter to the linear output circuit of a differential pressure transmitter while the zero is being set at zero flow. The span adjustment can then be made without affecting the zero adjustment. Two different circuits have been illustrated for accomplishing this in FIGS. 3 and 4. The preferred arrangement has been illustrated in FIG. 3. In FIG. 3, it will be seen that the transmitter circuit includes a switching means S which is positioned between the feedback coil 30 and the field coil 32f. The switching means S is of the double-pole, double-throw type and when it is in the measuring position, the field coil 32f is connected in series with the feedback coil 30 and the load. During zero adjustment, the switching means S is moved to the lower position illustrated in FIG. 3, thus, switching the field coil 32f from the output current circuit to the power supply so that the field coil 32f carries a fixed current and, thus, produces a fixed magnetic field in the air gap of the electromagnet 32 during zero adjustment. While the zero adjusting switch S is in the zero position, the resulting force on the balance beam 31, FIG. 1, will vary linearly with output current as the mechanical zero adjustment is being made, the same as though the magnet 32 were a permanent magnet as used in a differential pressure transmitter rather than an electromagnet, as utilized in a force balance flow transmitter.

As may be seen in FIG. 3, the voltage source for the oscillator-amplifier and its output transistor 35 has been illustrated as a battery 60 and is connected across a network which includes resistors $R_1$, $R_2$ and field coil 32f and transistor 35. It will be noted that the resistors $R_1$, $R_2$, the field coil 32f and the transistor 35 are arranged in the form of a bridge network when the switch S is in the zero adjusting position with the resistor $R_2$ and the field coil 32f being connected in series across the battery 60 and similarly the resistor $R_1$ and the transistor 35 being connected in series across the battery 60. The transistor 35 and the resistor $R_2$ are in opposite legs of the bridge as are resistor $R_1$ and the field coil 32f. The feedback coil 30 is connected across conjugate points of the bridge in series with the load which has been schematically illustrated as a resistance means in FIG. 3. Thus, it will be seen that the four arms of the bridge network are the resistor $R_1$, the output transistor 35 of the oscillator-amplifier, the resistor $R_2$, and the field coil 32f. The oscillator-amplifier and its output transistor 35 act as a variable resistance in the network. Since the output circuit of the transmitter becomes a bridge circuit during zero adjustment, the load current I can go negative as shown in FIG. 5. Therefore, the zero output current can be approached from either side of the zero by operating the zero adjustment shaft 53 as shown in FIG. 1.

In FIG. 4, there is a different arrangement illustrated for converting the flow transmitter circuit to measure differential pressure while the zero is being set at zero flow. In this arrangement, as also in FIG. 3, the field coil 32f and the feedback coil 30 are connected in series with the load during measurement. A switching means illustrated as including a switch S' is connected between the feedback coil 30 carried at one end of the lever or beam 31 and the damping coil 33 carried at the opposite end thereof, which, as previously described, is adapted to move in the air gap of the permanent magnet 34. During measurement, the damping coil 33 is shorted out of the circuit by means of switch S'. To convert the transmitter from flow to differential pressure measurement during the zero adjustment, the switch S' is moved to its zero position in FIG. 4 momentarily removing the short circuit from across the damping coil 33 so that the output current can flow through it and at the same time shorting out the feedback coil 30. Thus, the feedback force on beam 31 is now due to the current in the damping coil which is in the permanent magnet field of permanent magnet 34. Consequently, the force on the beam 31 is a linear function of current with constant slope through zero. Accordingly, the zero adjustment can accurately give zero output current for zero pressure differential and the span adjustment will not affect this zero adjustment.

Where it is desired to allow zero to be approached from either a positive or negative direction, the circuit of FIG. 4 may include an auxiliary power supply 61 and a resistor $R_3$ as illustrated. The switch S" is adapted to be moved between the "zero" and "measuring" positions concurrently with switch S' as by a mechanical connection. When a diode 62 is connected in series with the feedback coil 30, the switch S" may be permanently closed in zero position or replaced by a solid connection and the diode 62 will prevent flow of current in reverse direction through the meter M. Thus, it will be seen that either the diode 62 or the switch S" will act as means to prevent reverse flow of current in the circuit when measuring.

An output meter may be connected in either of the output circuits of FIG. 3 or 4 as illustrated by the meters M. Such a meter M has been illustrated in FIG. 2 in the transmitter 10 and the momentary zero adjusting switching means S or S' is positioned adjacent the meter M and accessible from the exterior of the transmitter 10. The above described system for providing independent zero and span adjustments of flow transmitters reduce the time required for calibrating the instruments in the factory as well as provide an important convenience for customers in making field calibrations of the instrument.

It shall be understood that this invention is not limited to the specific arrangements shown and that changes and modifications may be made within the scope of the appended claims.

What is claimed is:

1. A nonlinear differential pressure transmitter of the force balance type including:
    a stationary electromagnet having a field coil for producing a magnetic field,
    a balance beam having a feedback coil at one end thereof suspended in the magnetic field of said field coil,
    mechanical zero adjustment means connected to said balance beam to adjust the force thereon,
    a damping coil supported by said beam in the field of a permanent magnet,
    a load connected in series circuit with said field coil and said feedback coil during measurement,
    variable impedance means in circuit with said load and said feedback coil and said field coil,
    means for connecting a power supply to said circuit, and
    switching means connected between two of said coils and to one side of the power supply, said switching means being operable from a measuring position to a zero adjusting position to remove one of said coils from said series circuit during zero adjustment and to produce a resulting force on said balance beam which varies linearly as the mechanical zero adjustment is being made thereby permitting the transmitter to be calibrated for a precise zero current output with zero flow input.

2. A nonlinear differential pressure transmitter according to claim 1 wherein said damping coil is connected in series with said feedback coil and said field coil and said switching means is effective to short out said damping coil during measurement and to short out said feedback coil during zero adjustment of the transmitter.

3. A nonlinear differential pressure transmitter according to claim 1 wherein said switching means is operable from a measuring position to a zero adjusting position to remove said field coil from said series circuit during zero adjustment and to connect said field coil across the power supply so said field coil carries a fixed current thereby producing a fixed magnetic field in the air gap of said electromagnet during zero adjustment.

4. A nonlinear differential pressure transmitter according to claim 3 wherein said impedance means comprises variable resistance means in electrical circuit with a pair of resistance means and said field coil, said variable resistance means and one of said resistance means forming opposite legs of a bridge network and said other resistance means and said field coil forming the other opposite legs of said bridge network during zero adjustment and said load and said feedback coil are connected across the conjugate points of said bridge network whereby the load current can go negative and zero output current can be approached from either side of zero by operating said mechanical zero adjustment means.

5. In a nonlinear differential pressure transmitter of the force balance type in which the feedback force is obtained from a current-conducting coil in an electromagnetic field so that the force is a nonlinear function of current and the slope of the function through zero is less than that of a linear function of current, the improved method of adjusting the zero of the transmitter, comprising the steps of:
    converting the nonlinear transmitter circuit to one which measures differential pressure linearly,
    setting the zero adjustment at zero differential pressure, and
    returning the transmitter circuit to one which measures differential pressure nonlinearly.

6. The method of adjusting the zero of a nonlinear differential pressure transmitter according to claim 5 wherein the electro-magnetic field is produced by a fixed current which does not vary with the output current of the transmitter.

7. The method of adjusting zero of a nonlinear differential pressure transmitter according to claim 5 in which during zero adjustment the feedback force is obtained from a current-conducting coil in a permanent magnet field so that the force is a linear function of current with constant slope through zero.

8. A square root extracting flow transmitter of the force balance type including:
    a stationary electromagnet having a field coil for producing a magnetic field,
    a balance beam having a feedback coil at one end thereof suspended in the magnetic field of said field coil,
    mechanical zero adjustment means connected to said balance beam to adjust the force thereon,
    a damping coil supported by said beam in the field of a permanent magnet,
    a load connected in series circuit with said field coil and said feedback coil during measurement,
    variable resistance means in circuit with said load and said feedback coil and said field coil,
    a power supply connected in said circuit, and
    switching means connected between two of said coils and to one side of said power supply, said switching means being operable from a measuring position to a zero adjusting position to remove one of said coils from said series circuit during zero adjustment and to produce a resulting force on said balance beam which varies linearly as the mechanical zero adjustment is being made thereby permitting the transmitter to be calibrated for a precise zero current output with zero flow input.

9. A nonlinear differential pressure transmitter according to claim 2 including an auxiliary power supply and resistance means in series circuit with each other, and wherein said switching means includes means operable to connect said auxiliary power supply and said resistance means in a loop circuit with said variable impedance means and said means for connecting a power supply to said circuit whereby the load current can go negative and zero output current can be approached from either side of zero by operating said mechanical zero adjustment means.

10. A nonlinear differential pressure transmitter according to claim 2 including an auxiliary power supply and resistance means in series circuit with each other,
means for connecting said auxiliary power supply and said resistance means in a loop circuit with said variable impedance means and said means for connecting a power supply to said circuit whereby the load current can go negative and zero output current can be approached from either side of zero by operating said mechanical zero adjustment means, and
means in circuit with said auxiliary power supply to prevent reverse flow of current in said circuit.

11. A nonlinear differential pressure transmitter according to claim 10 wherein said last-named means comprises a diode.

12. A nonlinear differential pressure transmitter according to claim 10 wherein said last-named means comprises a switch.

13. In a nonlinear differential pressure transmitter of the force balance type in which the feedback is obtained from a current-conducting coil in an electromagnetic field whose magnitude varies as the feedback force, thereby making the force a nonlinear function of current through said current-conducting coil, the improved method of adjusting the zero of the transmitter, comprising the steps of:
momentarily switching the electromagnetic field to a constant value independent of the feedback force whereby differential pressure is linearly measured, and
setting the zero adjustment at zero diffential pressure while the differential pressure is being linearly measured.

References Cited

UNITED STATES PATENTS 2,686,893   8/1954   Markson _____ 318—22

ORIS L. RADER, *Primary Examiner.*

THOMAS E. LYNCH, *Assistant Examiner.*

U.S. Cl. X.R.

73—1, 398; 318—32; 324—34; 340—187